US008273421B2

(12) United States Patent
Saito et al.

(10) Patent No.: US 8,273,421 B2
(45) Date of Patent: *Sep. 25, 2012

(54) LIQUID CRYSTAL COMPOSITION AND LIQUID CRYSTAL DISPLAY DEVICE

(75) Inventors: Masayuki Saito, Chiba (JP); Norikatsu Hattori, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/124,352

(22) PCT Filed: Sep. 24, 2009

(86) PCT No.: PCT/JP2009/066540
§ 371 (c)(1),
(2), (4) Date: Apr. 14, 2011

(87) PCT Pub. No.: WO2010/044334
PCT Pub. Date: Apr. 22, 2010

(65) Prior Publication Data
US 2011/0198536 A1   Aug. 18, 2011

(30) Foreign Application Priority Data

Oct. 15, 2008  (JP) ................. 2008-266324

(51) Int. Cl.
C09K 19/34 (2006.01)
C09K 19/30 (2006.01)
C09K 19/12 (2006.01)
C09K 19/20 (2006.01)

(52) U.S. Cl. ............... 428/1.1; 252/299.61; 252/299.62; 252/299.63; 252/299.66; 252/299.67

(58) Field of Classification Search ............... 428/1.1; 252/299.61, 299.62, 299.63, 299.66, 299.67, 252/299.5
See application file for complete search history.

(56) References Cited

U.S. PATENT DOCUMENTS

| 6,558,758 | B1 | 5/2003 | Yanai et al. | |
| 8,137,583 | B2* | 3/2012 | Kubo et al. | 252/299.01 |
| 2001/0038091 | A1 | 11/2001 | Yanai et al. | |
| 2008/0303001 | A1 | 12/2008 | Hattori et al. | |
| 2011/0001918 | A1* | 1/2011 | Saito | 349/186 |
| 2011/0079753 | A1* | 4/2011 | Kubo et al. | 252/299.61 |
| 2011/0096285 | A1* | 4/2011 | Saito | 349/182 |
| 2011/0097519 | A1* | 4/2011 | Yanai et al. | 428/1.2 |
| 2011/0272631 | A1* | 11/2011 | Saito | 252/299.61 |

* cited by examiner

Primary Examiner — Shean C Wu
(74) Attorney, Agent, or Firm — J.C. Patents

(57) ABSTRACT

The invention is to provide a liquid crystal composition that satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat, or that is suitably balanced regarding at least two of the characteristics; and is to provide a AM device that has a short response time, a large voltage holding ratio, a large contrast ratio, a long service life and so forth; wherein the liquid crystal composition has negative dielectric anisotropy and includes a specific compound having tertahydropyran-2,5-diyl as a first component and a specific four-ring compound having a high maximum temperature as a second component, and the liquid crystal display device contains this composition.

20 Claims, No Drawings

LIQUID CRYSTAL COMPOSITION AND LIQUID CRYSTAL DISPLAY DEVICE

FIELD OF THE INVENTION

The invention relates mainly to a liquid crystal composition suitable for use in an active matrix (AM) device and so forth, and an AM device and so forth that contains the composition. More specifically, the invention relates to a liquid crystal composition having negative dielectric anisotropy, and a device containing the composition and having a mode such as in-plane switching (IPS), vertical alignment (VA) or polymer sustained alignment (PSA).

BACKGROUND OF THE INVENTION

In a liquid crystal display device, a classification based on an operating mode for liquid crystals includes modes of phase change (PC), twisted nematic (TN), super twisted nematic (STN), electrically controlled birefringence (ECB), optically compensated bend (OCB), in-plane switching (IPS), vertical alignment (VA) and polymer sustained alignment (PSA). A classification based on a driving mode in the device includes a passive matrix (PM) and an active matrix (AM). The PM is further classified into static, multiplex and so forth, and the AM is classified into a thin film transistor (TFT), a metal-insulator-metal (MIM) and so forth. The TFT is further classified into amorphous silicon and polycrystal silicon. The latter is classified into a high temperature type and a low temperature type according to the production process. A classification based on a light source includes a reflection type utilizing natural light, a transmission type utilizing a backlight and a semi-transmission type utilizing both natural light and a backlight.

These devices contain a liquid crystal composition having suitable characteristics. The liquid crystal composition has a nematic phase. General characteristics of the composition should be improved to give an AM device having good general characteristics. Table 1 below summarizes the relationship between the general characteristics of the two. The general characteristics of the composition will be explained further based on a commercially available AM device. The temperature range of a nematic phase relates to the temperature range in which the device can be used. A desirable maximum temperature of the nematic phase is 70° C. or higher and a desirable minimum temperature of the nematic phase is −10° C. or lower. The viscosity of the composition relates to the response time of the device. A short response time is desirable for displaying moving images on the device. Accordingly, a small viscosity of the composition is desirable. A small viscosity at a low temperature is more desirable.

TABLE 1

General Characteristics of Composition and AM Device

| No. | General Characteristics of Composition | General Characteristics of AM Device |
|---|---|---|
| 1 | wide temperature range of a nematic phase | wide usable temperature range |
| 2 | small viscosity [1] | short response time |
| 3 | suitable optical anisotropy | large contrast ratio |
| 4 | positively or negatively large dielectric anisotropy | low threshold voltage and small electric power consumption large contrast ratio |
| 5 | large specific resistance | large voltage holding ratio and large contrast ratio |
| 6 | high stability to ultraviolet light and heat | long service life |

[1] A liquid crystal composition can be injected into a liquid crystal cell in a shorter period of time.

The optical anisotropy of the composition relates to the contrast ratio of the device. The product (Δn×d) of the optical anisotropy (Δn) of the composition and the cell gap (d) of the device is designed so as to maximize the contrast ratio. A suitable value of the product depends on the kind of operating mode. In a device having a VA mode, a suitable value is in the range of 0.30 μm to 0.40 μm, and in a device having an IPS mode, a suitable value is in the range of 0.20 μm to 0.30 μm. In this case, a composition having a large optical anisotropy is desirable for a device having a small cell gap. A large absolute value of the dielectric anisotropy in the composition contributes to a low threshold voltage, small electric power consumption and a high contrast ratio of the device. Accordingly, a large absolute value of the dielectric anisotropy is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance is desirable at room temperature and also at a high temperature after it has been used for a long time. The stability of the composition to ultraviolet light and heat relates to the service life of the liquid crystal display device. In the case where the stability is high, the device has a long service life. Such characteristics are desirable for an AM device used in a liquid crystal projector, a liquid crystal television and so forth.

A composition having positive dielectric anisotropy is used for an AM device having a TN mode. On the other hand, a composition having negative dielectric anisotropy is used for an AM device having a VA mode. A composition having positive or negative dielectric anisotropy is used for an AM device having an IPS mode. A composition having positive or negative dielectric anisotropy is used for an AM device having a PSA mode. Examples of the liquid crystal composition having negative dielectric anisotropy are disclosed in the following patent documents No. 1 to No. 3.

PRIOR ART

Patent Document

Patent document No. 1: JP 2001-262145 A.
Patent document No. 2: JP 2001-115161 A.
Patent document No. 3: WO 2008/114821 A.

A desirable AM device has characteristics such as a wide temperature range in which the device can be used, a short response time, a large contrast ratio, a low threshold voltage, a large voltage holding ratio and a long service life. Response time that is even one millisecond shorter than that of the other devices is desirable. Thus, desirable characteristics of the composition include a high maximum temperature of a nematic phase, a low minimum temperature of a nematic phase, a small viscosity, a suitable optical anisotropy, a large positive or negative dielectric anisotropy, a large specific resistance, a high stability to ultraviolet light and a high stability to heat.

OUTLINE OF THE INVENTION

Subject to be Solved by the Invention

One of the aims of the invention is to provide a liquid crystal composition that satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat. Another aim is to provide a liquid crystal composition that is suitably balanced regarding at least two of the characteristics. A further aim is to provide a liquid crystal display device that contains such a composition. An additional aim is to provide a liquid crystal composition that has a suitable optical anisotropy which means a large optical anisotropy or a small optical anisotropy, a large negative dielectric anisotropy, a high stability to ultraviolet light and so forth, and is to provide an AM device that has a short response time, a large voltage holding ratio, a large contrast ratio, a long service life and so forth.

Means for Solving the Subject

The invention concerns a liquid crystal composition that has negative dielectric anisotropy and includes at least one compound selected from the group of compounds represented by formula (1) as a first component and at least one compound selected from the group of compounds represented by formula (2) as a second component, and concerns a liquid crystal display device containing this composition:

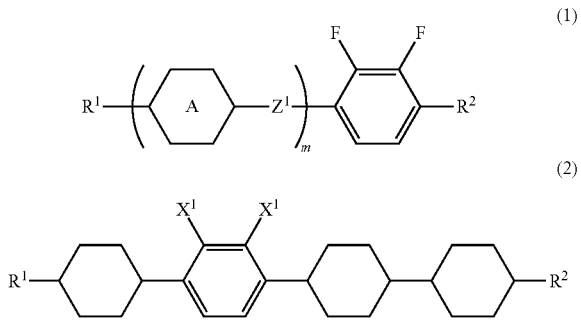

wherein $R^1$ and $R^2$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring A is independently tertahydropyran-2,5-diyl, 1,4-cyclohexylene or 1,4-phenylene, and at least one of the rings A is tertahydropyran-2,5-diyl; $Z^1$ is independently a single bond, ethylene, methyleneoxy or carbonyloxy; one of $X^1$ and $X^2$ is hydrogen and the other is fluorine; and m is 1, 2 or 3.

Effect of the Invention

An advantage of the invention is a liquid crystal composition that satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat. One aspect of the invention is a liquid crystal composition that is suitably balanced regarding at least two of the characteristics. Another aspect is a liquid crystal display device that contains such a composition. A further aspect is a composition that has a suitable optical anisotropy, a large negative dielectric anisotropy, a high stability to ultraviolet light and so forth, and an AM device that has a short response time, a large voltage holding ratio, a large contrast ratio, a long service life and so forth.

EMBODIMENT TO CARRY OUT THE INVENTION

Usage of the terms in the specification and claims is as follows. The liquid crystal composition of the invention and the liquid crystal display device of the invention may be abbreviated to "the composition" and "the device," respectively. "A liquid crystal display device" is a generic term for a liquid crystal display panel and a liquid crystal display module. "A liquid crystal compound" is a generic term for a compound having a liquid crystal phase such as a nematic phase or a smectic phase, and also for a compound having no liquid crystal phases but being useful as a component of a composition. Such a useful compound has a six-membered ring such as 1,4-cyclohexylene and 1,4-phenylene, and a rod-like molecular structure. An optically active compound and a polymerizable compound may occasionally be added to the composition. Even in the case where these compounds are liquid crystalline, the compounds are classified as an additive herein. At least one compound selected from the group of compounds represented by formula (1) may be abbreviated to "the compound (1)." "The compound (1)" means one compound, or two or more compounds represented by formula (1). The same rules apply to compounds represented by the other formulas. "Arbitrary" is used not only in cases where the position is arbitrary but also in cases where the number is arbitrary. However, it is not used in cases where the number is 0 (zero).

A higher limit of the temperature range of a nematic phase may be abbreviated to "the maximum temperature." A lower limit of the temperature range of a nematic phase may be abbreviated to "the minimum temperature." That "specific resistance is large" means that a composition has a large specific resistance at room temperature and also at temperatures close to the maximum temperature of a nematic phase in the initial stage, and that the composition has a large specific resistance at room temperature and also at temperatures close to the maximum temperature of a nematic phase even after it has been used for a long time. That "a voltage holding ratio is large" means that a device has a large voltage holding ratio at room temperature and also at temperatures close to the maximum temperature of a nematic phase in the initial stage, and that the device has a large voltage holding ratio at room temperature and also at temperatures close to the maximum temperature of a nematic phase even after it has been used for a long time. When characteristics such as optical anisotropy are explained, values which are obtained according to the measuring methods described in Examples will be used. A first component means one compound, or two or more compounds. "The ratio of the first component" is expressed as a percentage by weight (% by weight) of the first component based on the total weight of the liquid crystal composition. The same rule applies to the ratio of a second component and so forth. The ratio of an additive mixed with the composition is expressed as a percentage by weight (% by weight) or weight parts per million (ppm) based on the total weight of the liquid crystal composition.

The symbol $R^1$ is used for a plurality of compounds in the chemical formulas of component compounds. The meanings of $R^1$ may be the same or different in two arbitrary compounds among these. In one case, for example, $R^1$ of the compound (1) is ethyl and $R^1$ of the compound (2) is ethyl. In another case, $R^1$ of the compound (1) is ethyl and $R^1$ of the compound (2) is propyl. The same rule applies to the symbols $R^2$, $Z^1$ and so forth.

The invention includes the following items.

Item 1. A liquid crystal composition that has negative dielectric anisotropy and includes at least one compound selected from the group of compounds represented by formula (1) as a first component and at least one compound selected from the group of compounds represented by formula (2) as a second component:

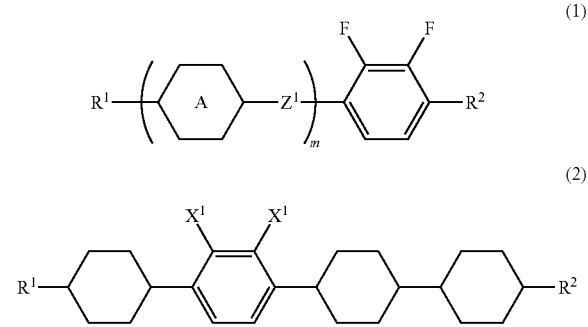

(1)

(2)

wherein $R^1$ and $R^2$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring A is independently tertahydropyran-2,5-diyl, 1,4-cyclohexylene or 1,4-phenylene, and at least one of the rings A is tertahydropyran-2,5-diyl; $Z^1$ is independently a single bond, ethylene, methyleneoxy or carbonyloxy; one of $X^1$ and $X^2$ is hydrogen and the other is fluorine; and m is 1, 2 or 3.

Item 2. The liquid crystal composition according to item 1, wherein the first component is at least one compound selected from the group of compounds represented by formula (1-1) to formula (1-7)

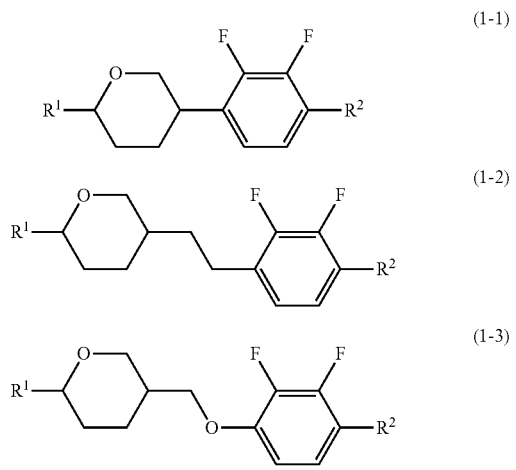

(1-1)

(1-2)

(1-3)

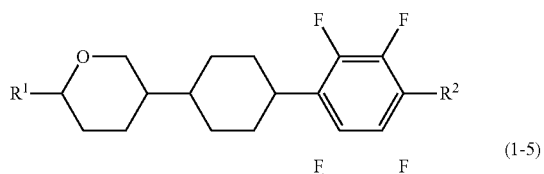

(1-4)

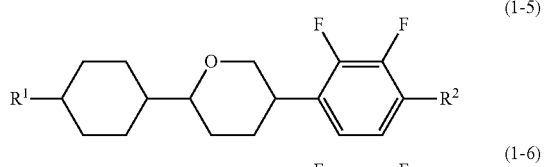

(1-5)

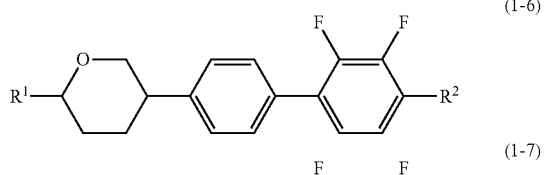

(1-6)

(1-7)

wherein $R^1$ and $R^2$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 3. The liquid crystal composition according to item 2, wherein the first component is at least one compound selected from the group of compounds represented by formula (1-1) to formula (1-3).

Item 4. The liquid crystal composition according to item 2, wherein the first component is at least one compound selected from the group of compounds represented by formula (1-4) to formula (1-7).

Item 5. The liquid crystal composition according to item 2, wherein the first component is a mixture of at least one compound selected from the group of compounds represented by formula (1-1) to formula (1-3) and at least one compound selected from the group of compounds represented by formula (1-4) to formula (1-7).

Item 6. The liquid crystal composition according to any one of items 1 to 5, wherein the second component is at least one compound selected from the group of compounds represented by formula (2-1):

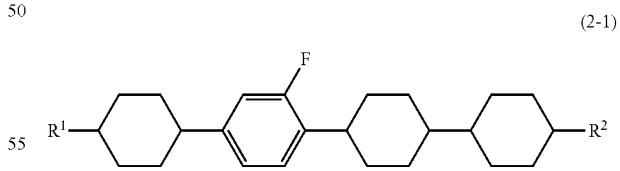

(2-1)

wherein $R^1$ and $R^2$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 7. The liquid crystal composition according to any one of items 1 to 6, wherein the ratio of the first component is in the range of 5% by weight to 70% by weight and the ratio of the second component is in the range of 5% by weight to 30% by weight, based on the total weight of the liquid crystal composition.

Item 8. The liquid crystal composition according to any one of items 1 to 7, further including at least one compound selected from the group of compounds represented by formula (3) as a third component:

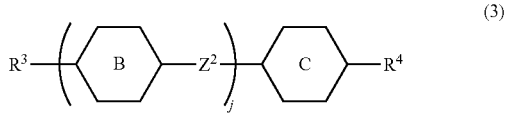

wherein R³ and R⁴ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring B and the ring C are independently 1,4-cyclohexylene, 1,4-phenylene, 2-fluoro-1,4-phenylene, 3-fluoro-1,4-phenylene or 2,5-difluoro-1,4-phenylene; $Z^2$ is independently a single bond, ethylene or carbonyloxy; and j is 1 or 2.

Item 9. The liquid crystal composition according to item 8, wherein the third component is at least one compound selected from the group of compounds represented by formula (3-1) to formula (3-7)

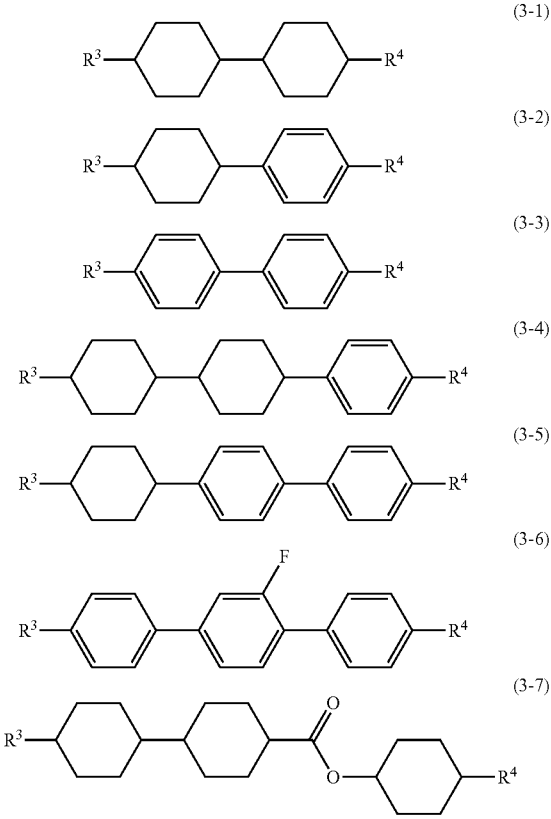

wherein R³ and R⁴ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 10. The liquid crystal composition according to item 9, wherein the third component is at least one compound selected from the group of compounds represented by formula (3-1).

Item 11. The liquid crystal composition according to item 9, wherein the third component is a mixture of at least one compound selected from the group of compounds represented by formula (3-1) and at least one compound selected from the group of compounds represented by formula (3-4).

Item 12. The liquid crystal composition according to item 9, wherein the third component is a mixture of at least one compound selected from the group of compounds represented by formula (3-1) and at least one compound selected from the group of compounds represented by formula (3-6).

Item 13. The liquid crystal composition according to item 9, wherein the third component is a mixture of at least one compound selected from the group of compounds represented by formula (3-1), at least one compound selected from the group of compounds represented by formula (3-4), and at least one compound selected from the group of compounds represented by formula (3-6).

Item 14. The liquid crystal composition according to any one of items 8 to 13, wherein the ratio of the third component is in the range of 30% by weight to 70% by weight based on the total weight of the liquid crystal composition.

Item 15. The liquid crystal composition according to any one of items 1 to 14, further including at least one compound selected from the group of compounds represented by formula (4-1) and formula (4-2) as a fourth component:

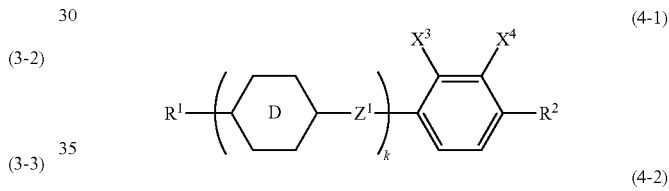

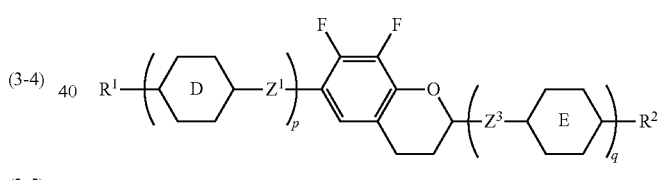

wherein R¹ and R² are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring D and the ring E are independently 1,4-cyclohexylene or 1,4-phenylene; $Z^1$ and $Z^3$ are independently a single bond, ethylene, methyleneoxy or carbonyloxy; $X^3$ and $X^4$ are independently fluorine or chlorine; k is 1, 2 or 3; and p and q are independently 0, 1, 2 or 3, and sum of p and q is 3 or less.

Item 16. The liquid crystal composition according to item 15, wherein the fourth component is at least one compound selected from the group of compounds represented by formula (4-1-1) to formula (4-1-7) and formula (4-2-1) to formula (4-2-4)

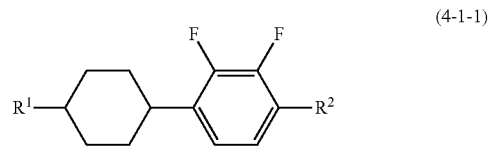

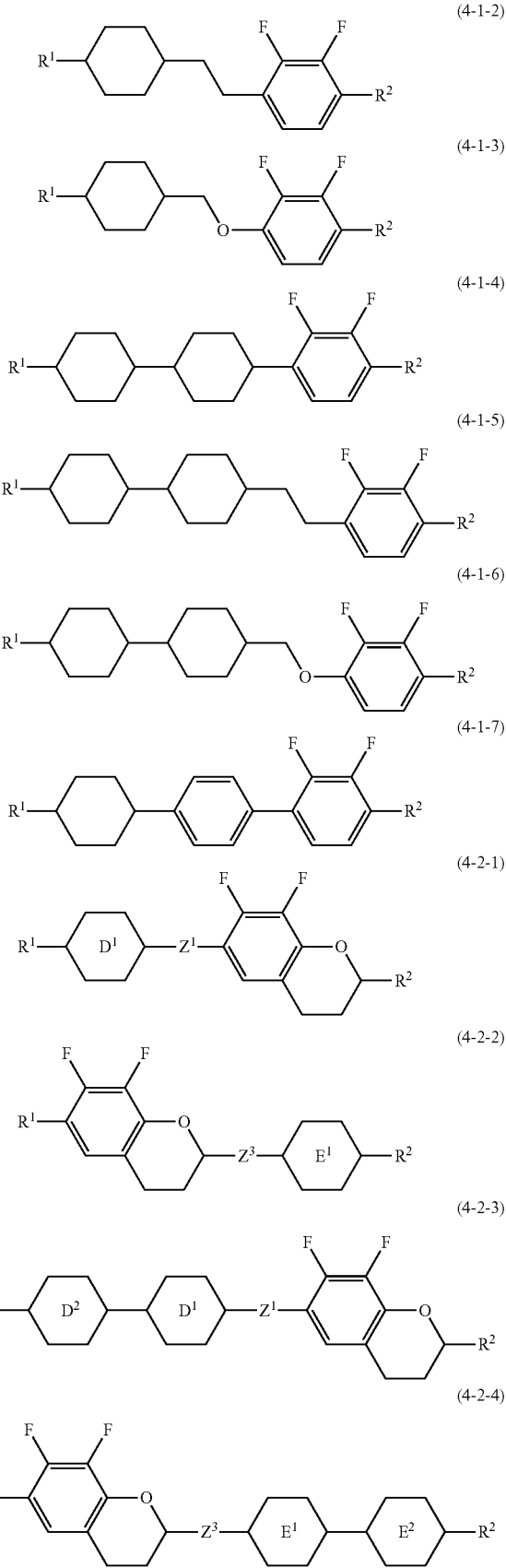

wherein $R^1$ and $R^2$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring $D^1$, the ring $D^2$, the ring $E^1$ and the ring $E^2$ are independently 1,4-cyclohexylene or 1,4-phenylene; and $Z^1$ and $Z^3$ are independently a single bond, ethylene, methyleneoxy or carbonyloxy.

Item 17. The liquid crystal composition according to item 16, wherein the fourth component is at least one compound selected from the group of compounds represented by formula (4-1-1).

Item 18. The liquid crystal composition according to item 16, wherein the fourth component is a mixture of at least one compound selected from the group of compounds represented by formula (4-1-1) and at least one compound selected from the group of compounds represented by formula (4-1-4).

Item 19. The liquid crystal composition according to item 16, wherein the fourth component is a mixture of at least one compound selected from the group of compounds represented by formula (4-1-1) and at least one compound selected from the group of compounds represented by formula (4-1-7).

Item 20. The liquid crystal composition according to item 16, wherein the fourth component is a mixture of at least one compound selected from the group of compounds represented by formula (4-1-1), at least one compound selected from the group of compounds represented by formula (4-1-4), and at least one compound selected from the group of compounds represented by formula (4-1-7).

Item 21. The liquid crystal composition according to any one of items 15 to 20, wherein the ratio of the fourth component is in the range of 5% by weight to 50% by weight based on the total weight of the liquid crystal composition.

Item 22. The liquid crystal composition according to any one of items 1 to 21, wherein the maximum temperature of a nematic phase is 70° C. or higher, the optical anisotropy (25° C.) at a wavelength of 589 nanometers is 0.08 or more, and the dielectric anisotropy (25° C.) at a frequency of 1 kHz is −2 or less.

Item 23. A liquid crystal display device containing the liquid crystal composition according to any one of items 1 to 22.

Item 24. The liquid crystal display device according to item 23, wherein an operating mode of the liquid crystal display device is a VA mode, an IPS mode or a PSA mode, and a driving mode of the liquid crystal display device is an active matrix mode.

The invention further includes the following items: (1) the composition described above that further includes an optically active compound; (2) the composition described above that further includes an additive, such as an antioxidant, an ultraviolet light absorber and an antifoaming agent; (3) an AM device that contains the composition described above; (4) a device that has a mode of TN, ECB, OCB, IPS, VA or PSA and contains the composition described above; (5) a transmission-type device that contains the composition described above; (6) use of the composition described above as a composition having a nematic phase; and (7) use of an optically active composition prepared by the addition of an optically active compound to the composition described above.

The composition of the invention will be explained in the following order. First, the constitution of component compounds in the composition will be explained. Second, main characteristics of the component compounds and main effects of these compounds on the composition will be explained. Third, a combination of components in the composition, desirable ratios of the component compounds and the basis thereof will be explained. Fourth, a desirable embodiment of the component compounds will be explained. Fifth, specific examples of the component compounds will be shown. Sixth, additives that may be mixed with the composition will be explained. Seventh, methods for synthesizing the component compounds will be explained. Last, use of the composition will be explained.

First, the constitution of component compounds in the composition will be explained. The compositions of the invention are classified into the composition A and the composition B. The composition A may further include any other liquid crystal compound, an additive and an impurity. "Any other liquid crystal compound" is a liquid crystal compound that is different from the compound (1), the compound (2), the compound (3), the compound (4-1) and the compound (4-2). Such a compound is mixed with the composition for the purpose of further adjusting characteristics of the composition. Of any other liquid crystal compound, a smaller amount of a cyano compound is desirable in view of its stability to heat or ultraviolet light. A more desirable ratio of the cyano compound is 0% by weight. The additive includes an optically active compound, an antioxidant, an ultraviolet light absorber, a coloring matter, an antifoaming agent, a polymerizable compound and a polymerization initiator. The impurity is compounds and so forth which have contaminated component compounds in a process such as their synthesis. Even in the case where the compound is liquid crystalline, it is classified into the impurity herein.

The composition B consists essentially of compounds selected from the group of the compound (1), the compound (2), the compound (3), the compound (4-1) and the compound (4-2). The term "essentially" means that the composition may include an additive and an impurity, but does not include any liquid crystal compound other than these compounds. The composition B has a smaller number of components than the composition A. The composition B is preferable to the composition A in view of cost reduction. The composition A is preferable to the composition B in view of the fact that physical properties can be further adjusted by adding any other liquid crystal compound.

Second, main characteristics of the component compounds and main effects of the compounds on the characteristics of the composition will be explained. The main characteristics of the component compounds are summarized in Table 2 on the basis of the effects of the invention. In Table 2, the symbol L stands for "large" or "high", the symbol M stands for "medium", and the symbol S stands for "small" or "low." The symbols L, M and S are classified according to a qualitative comparison among the component compounds, and 0 (zero) means that "a value is nearly zero."

TABLE 2

Characteristics of Compounds

| | Compounds | | | | |
|---|---|---|---|---|---|
| | Compound (1) | Compound (2) | Compound (3) | Compound (4-1) | Compound (4-2) |
| Maximum Temperature | M-L | L | S-L | M-L | S-M |
| Viscosity | M-L | M | S-M | M-L | L |
| Optical Anisotropy | M | M | S-L | M-L | M-L |
| Dielectric Anisotropy | M-L [1] | 0 | 0 | S-L [1] | L [1] |
| Specific Resistance | L | L | L | L | L |

[1] Value of optical anisotropy is negative, and the symbol expresses the magnitude of the absolute value.

Main effects of the component compounds on the characteristics of the composition upon mixing the component compounds with the composition are as follows. The compound (1) increases the absolute value of the dielectric anisotropy and decreases the minimum temperature. The compound (2) increases the maximum temperature. The compound (3) decreases the viscosity or increases the maximum temperature. The compound (4-1) decreases the minimum temperature. The compound (4-2) increases the absolute value of the dielectric anisotropy.

Third, a combination of the components in the composition, desirable ratios of the component compounds and the basis thereof will be explained. A combination of the components in the composition is the first and second components, the first, second and third components, the first, second and fourth components and the first, second, third and fourth components. A combination of components in a desirable composition is the first, second and third components and the first, second, third and fourth components.

A desirable ratio of the first component is 5% by weight or more for increasing the absolute value of the dielectric anisotropy, and 70% by weight or less for decreasing the minimum temperature. A more desirable ratio is in the range of 5% by weight to 60% by weight. An especially desirable ratio is in the range of 10% by weight to 50% by weight.

A desirable ratio of the second component is 5% by weight or more for increasing the maximum temperature, and 30% by weight or less for increasing the absolute value of the dielectric anisotropy. A more desirable ratio is in the range of 5% by weight to 25% by weight. An especially desirable ratio is in the range of 5% by weight to 20% by weight.

A desirable ratio of the third component is 30% by weight or more for decreasing the viscosity or for increasing the maximum temperature, and 70% by weight or less for increasing the absolute value of the dielectric anisotropy. A more desirable ratio is in the range of 35% by weight to 65% by weight. An especially desirable ratio is in the range of 40% by weight to 60% by weight.

A desirable ratio of the fourth component is 5% by weight or more for increasing the optical anisotropy, and 50% by weight or less for decreasing the minimum temperature. A more desirable ratio is in the range of 5% by weight to 45% by weight. An especially desirable ratio is in the range of 5% by weight to 40% by weight.

Fourth, a desirable embodiment of the component compounds will be explained. $R^1$, $R^2$, $R^3$ and $R^4$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Desirable $R^1$ or $R^2$ is alkyl having 1 to 12 carbons for increasing the stability to ultraviolet light, heat or the like and alkoxy having 1 to 12 carbons for increasing the absolute value of the dielectric anisotropy. Desirable $R^3$ or $R^4$ is alkyl having 1 to 12 carbons for increasing the stability to ultraviolet light or heat, and alkenyl having 2 to 12 carbons for decreasing the minimum temperature.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. A desirable configuration of —CH=CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity for instance. C is preferable in the alkenyl such as 2-butenyl, 2-pentenyl and 2-hexenyl. In the alkenyl, straight-chain alkenyl is preferable to branched-chain alkenyl.

Desirable examples of alkenyl in which arbitrary hydrogen is replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. More desirable examples are 2,2-difluorovinyl and 4,4-difluoro-3-butenyl for decreasing the viscosity.

The ring A is independently tertahydropyran-2,5-diyl, 1,4-cyclohexylene or 1,4-phenylene, and at least one of the rings A is tertahydropyran-2,5-diyl. Arbitrary two of the ring A may be the same or different when m is 2 or 3. Desirable ring A is each tertahydropyran-2,5-diyl for increasing the absolute value of the dielectric anisotropy. Tertahydropyran-2,5-diyl is

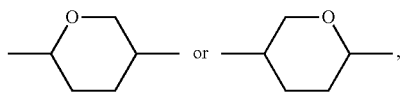

and preferably

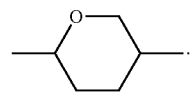

The ring B and the ring C are independently 1,4-cyclohexylene, 1,4-phenylene, 2-fluoro-1,4-phenylene, 3-fluoro-1,4-phenylene or 2,5-difluoro-1,4-phenylene, and arbitrary two of the ring B may be the same or different when j is 2. Desirable ring B or ring C is 1,4-cyclohexylene for decreasing the viscosity. The ring D, the ring $D^1$, the ring $D^2$, the ring E, the ring $E^1$ and the ring $E^2$ are independently 1,4-cyclohexylene or 1,4-phenylene, and arbitrary two of the ring D may be the same or different when k or p is 2 or 3, and arbitrary two of the ring E may be the same or different when q is 2 or 3. Desirable ring D, ring $D^1$, ring $D^2$, ring E, ring $E^1$ or ring $E^2$ is 1,4-cyclohexylene for decreasing the optical anisotropy.

$Z^1$ and $Z^3$ are independently a single bond, ethylene, methyleneoxy or carbonyloxy, and arbitrary two of $Z^1$ may be the same or different when m, k or p is 2 or 3, and arbitrary two of $Z^3$ may be the same or different when q is 2 or 3. Desirable $Z^1$ or $Z^3$ is a single bond for decreasing the viscosity and methyleneoxy for increasing the absolute value of the dielectric anisotropy. $Z^2$ is a single bond, ethylene or carbonyloxy, and arbitrary two of $Z^2$ may be the same or different when j is 2. Desirable $Z^2$ is a single bond for decreasing the viscosity.

One of $X^1$ and $X^2$ is hydrogen and the other is fluorine. In desirable $X^1$ and $X^2$, $X^1$ is hydrogen and $X^2$ is fluorine for decreasing the minimum temperature. $X^3$ and $X^4$ are independently fluorine or chlorine. Desirable $X^3$ or $X^4$ is fluorine for decreasing the viscosity.

m is 1, 2 or 3. Desirable m is 1 for decreasing the minimum temperature, is 2 for increasing the maximum temperature. j is 1 or 2. Desirable j is 1 for decreasing the viscosity. k is 1, 2 or 3. Desirable k is 1 for decreasing the minimum temperature. p and q are independently 0, 1, 2 or 3, and the sum of p and q is 3 or less. Desirable p is 2 for increasing the maximum temperature. Desirable q is 0 for decreasing the minimum temperature.

Fifth, specific examples of the component compounds will be shown. In the desirable compounds described below, $R^5$ is straight-chain alkyl having 1 to 12 carbons or straight-chain alkoxy having 1 to 12 carbons. $R^6$ and $R^7$ are independently straight-chain alkyl having 1 to 12 carbons or straight-chain alkenyl having 2 to 12 carbons. With regard to the configuration of 1,4-cyclohexylene in these compounds, trans is preferable to cis for increasing the maximum temperature.

Desirable compound (1) are the compound (1-1-1) to the compound (1-7-1). More desirable compound (1) are the compound (1-1-1), the compound (1-3-1) and the compound (1-5-1). Especially desirable compound (1) are the compound (1-1-1) and the compound (1-5-1). Desirable compound (2) is the compound (2-1-1). Desirable compound (3) are the compound (3-1-1) to the compound (3-7-1). More desirable compound (3) are the compound (3-1-1), the compound (3-3-1), the compound (3-4-1) and the compound (3-6-1). Especially desirable compound (3) are the compound (3-1-1), the compound (3-4-1) and the compound (3-6-1). Desirable compound (4-1) are the compound (4-1-1-1) to the compound (4-1-7-1). More desirable compound (4-1) are the compound (4-1-1-1), the compound (4-1-3-1), the compound (4-1-4-1), the compound (4-1-6-1) and the compound (4-1-7-1). Especially desirable compound (4-1) are the compound (4-1-1-1), the compound (4-1-4-1) and the compound (4-1-7-1). Desirable compound (4-2) are the compound (4-2-1-1), the compound (4-2-1-2), the compound (4-2-2-1), the compound (4-2-3-1) to the compound (4-2-3-5), the compound (4-2-4-1) and the compound (4-2-4-2). More desirable compound (4-2) are the compound (4-2-1-2), the compound (4-2-3-1), the compound (4-2-3-3) and the compound (4-2-4-1). Especially desirable compound (4-2) are the compound (4-2-1-2) and the compound (4-2-3-3).

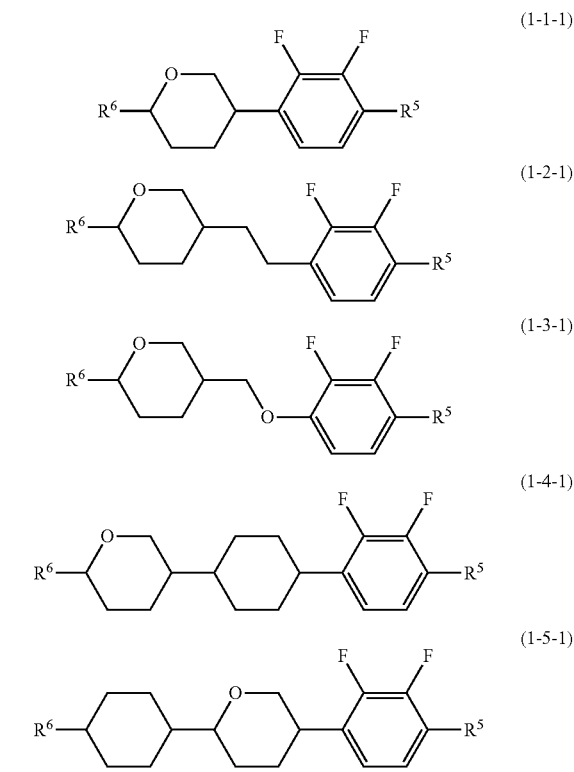

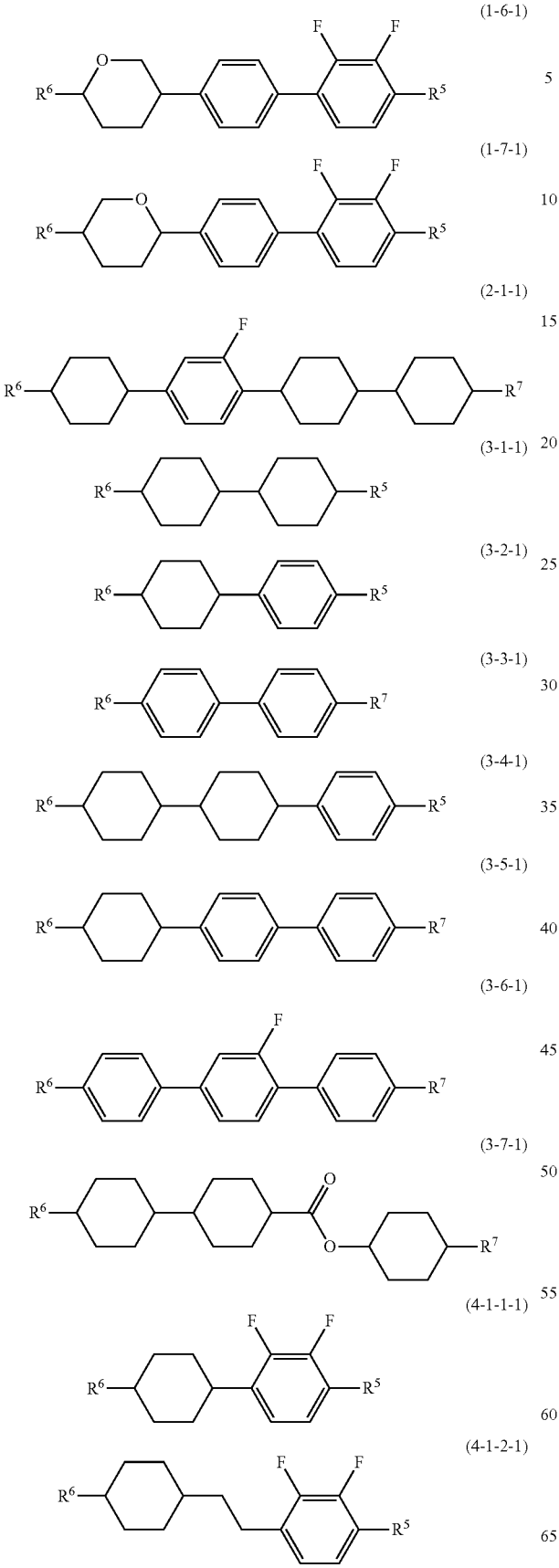
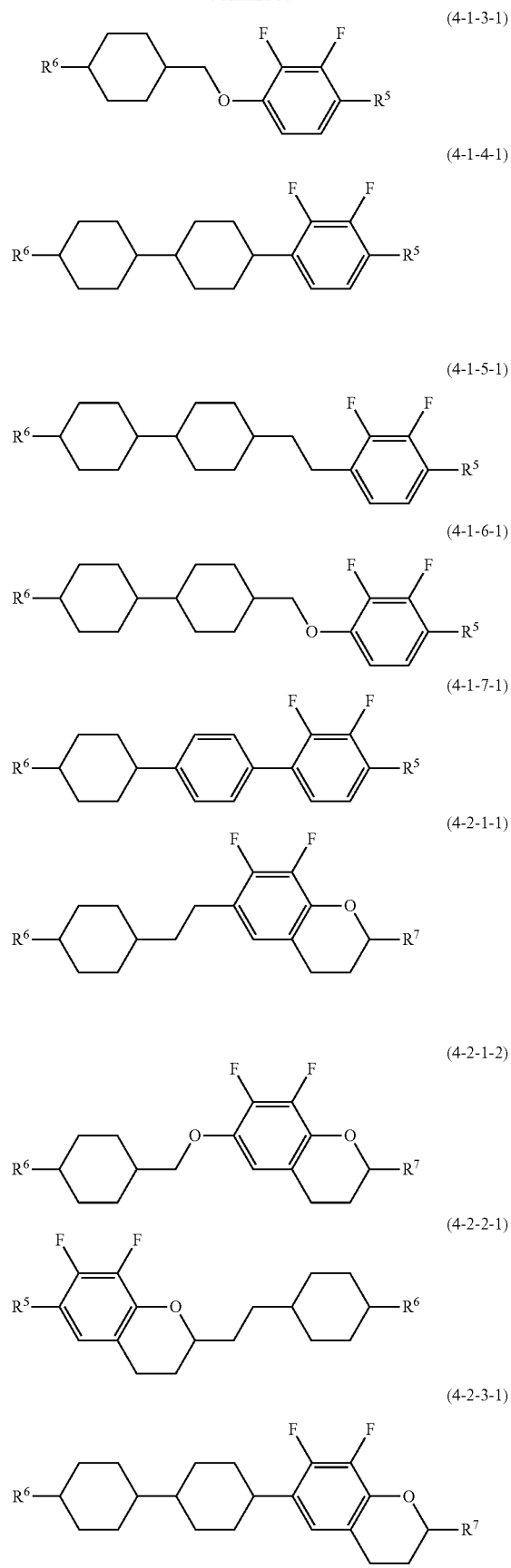

-continued (4-2-3-2)
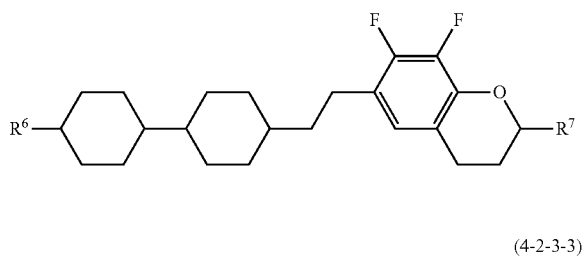

(4-2-3-3)

(4-2-3-4)

(4-2-3-5)

(4-2-4-1)

(4-2-4-2)
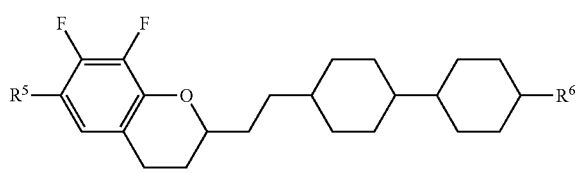

Sixth, additives which may be mixed with the composition will be explained. Such additives include an optically active compound, an antioxidant, an ultraviolet light absorber, a coloring matter, an antifoaming agent, a polymerizable compound and a polymerization initiator. The optically active compound is mixed with the composition for the purpose of inducing a helical structure and giving a twist angle in liquid crystals. Examples of such compounds include the compound (5-1) to the compound (5-4). A desirable ratio of the optically active compound is 5% by weight or less, and a more desirable ratio is in the range of 0.01% by weight to 2% by weight.

(5-1)
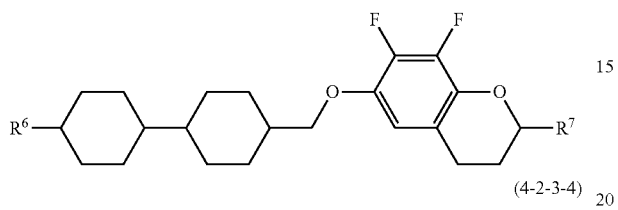

(5-2)
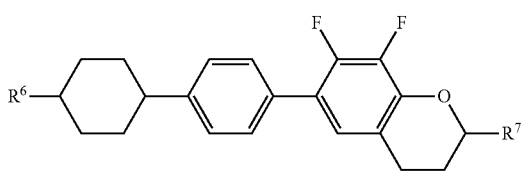

(5-3)
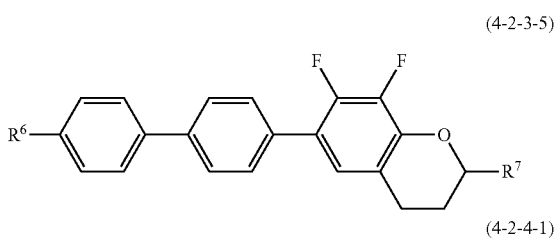

(5-4)
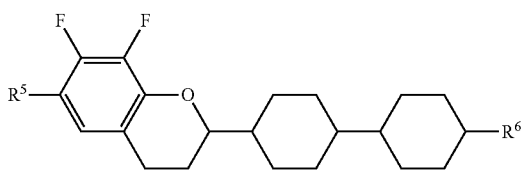

An antioxidant is mixed with the composition in order to prevent a decrease in specific resistance that is caused by heating under air, or to maintain a large voltage holding ratio at room temperature and also at temperatures close to the maximum temperature of a nematic phase after the device has been used for a long time.

(6)
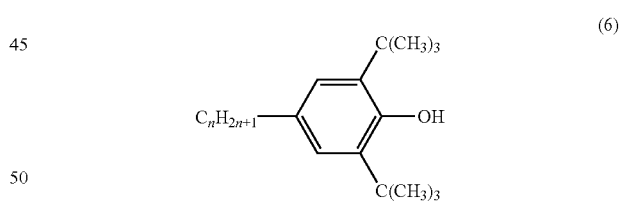

Desirable examples of the antioxidant include the compound (6) where n is an integer from 1 to 9. In the compound (6), desirable n is 1, 3, 5, 7 or 9. More desirable n is 1 or 7. The compound (6) where n is 1 is effective in preventing a decrease in specific resistance that is caused by heating under air because it has a large volatility. The compound (6) where n is 7 is effective in maintaining a large voltage holding ratio at room temperature and also at temperatures close to the maximum temperature of a nematic phase even after the device has been used for a long time, because it has a small volatility. A desirable ratio of the antioxidant is 50 ppm or more for achieving its effect and is 600 ppm or less for avoiding a decrease in the maximum temperature or avoiding an increase in the minimum temperature. A more desirable ratio is in the range of 100 ppm to 300 ppm.

Desirable examples of the ultraviolet light absorber include a benzophenone derivative, a benzoate derivative and a triazole derivative. A light stabilizer such as an amine having steric hindrance is also desirable. A desirable ratio of the ultraviolet light absorber or the light stabilizer is 50 ppm or more for achieving its effect and is 10,000 ppm or less for avoiding a decrease in the maximum temperature or avoiding an increase in the minimum temperature. A more desirable ratio is in the range of 100 ppm to 10,000 ppm.

A dichroic dye such as an azo dye or an anthraquinone dye is mixed with the composition for adjusting to a device having a guest host (GH) mode. A desirable ratio of the coloring matter is in the range of 0.01% by weight to 10% by weight. An antifoaming agent such as dimethyl silicone oil or methyl phenyl silicone oil is mixed with the composition for preventing foam formation. A desirable ratio of the antifoaming agent is 1 ppm or more for achieving its effect and is 1,000 ppm or less for avoiding a poor display. A more desirable ratio is in the range of 1 ppm to 500 ppm.

A polymerizable compound is mixed with the composition for adjusting to a device having a polymer sustained alignment (PSA) mode. Desirable examples of the polymerizable compound include compounds having a polymerizable group, such as acrylates, methacrylates, vinyl compounds, vinyloxy compounds, propenyl ethers, epoxy compounds (oxiranes, oxetanes) and vinyl ketones. Especially desirable examples of the polymerizable compound are acrylate derivatives or methacrylate derivatives. A desirable ratio of the polymerizable compound is 0.05% by weight or more for achieving its effect and is 10% by weight or less for avoiding a poor display. A more desirable ratio is in the range of 0.1% by weight to 2% by weight. The polymerizable compound is polymerized on irradiation with ultraviolet light or the like, preferably in the presence of a suitable initiator such as a photopolymerization initiator. Suitable conditions for polymerization, suitable types of the initiator and suitable amounts thereof are known to a person skilled in the art and are described in the literature. For example, Irgacure 651 (registered trademark), Irgacure 184 (registered trademark) or Darocure 1173 (registered trademark) (Ciba Japan K.K.), each of which is a photopolymerization initiator, is suitable for radical polymerization. The polymerizable compound includes the photopolymerization initiator preferably in the range of 0.1% by weight to 5% by weight and most preferably in the range of 1% by weight to 3% by weight.

Seventh, methods for synthesizing the component compounds will be explained. These compounds can be synthesized by known methods. The synthetic methods will be exemplified as follows. The compound (1-2-2) is prepared by the method described in JP 2000-008040 A (2000). The compound (2-1-1) is prepared by the method described in JP 2000-328060 A (2000). The compound (3-1-1) and the compound (3-4-1) is prepared by the method described in JP S59-176221 A (1984). The compound (4-1-1-1) and the compound (4-1-4-1) are prepared by the method described in JP H02-503441 A (1990). The compound (4-2-2-1) is prepared by the method described in JP 2005-035986 A (2005). An antioxidant is commercially available. The compound of where n is 1 in formula (6) is available from Sigma-Aldrich Corporation. The compound (6) where n is 7, and so forth are synthesized according to the method described in U.S. Pat. No. 3,660,505.

Compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press), New experimental Chemistry Course (Shin Jikken Kagaku Kouza, in Japanese; Maruzen Co., Ltd.). The composition is prepared according to known methods using the compounds thus obtained. For example, the component compounds are mixed and dissolved each other by heating.

Last, use of the composition will be explained. Most of the compositions of the invention have a minimum temperature of −10° C. or lower, a maximum temperature of 70° C. or higher, and an optical anisotropy in the range of 0.07 to 0.20. A device containing this composition has a large voltage holding ratio. The composition is suitable for an AM device. The composition is suitable especially for an AM device having a transmission type. The composition having an optical anisotropy in the range of 0.08 to 0.25 may be prepared by adjusting ratios of the component compounds or by mixing with any other liquid crystal compound. The composition can be used as a composition having a nematic phase, or as an optically active composition by the addition of an optically active compound.

The composition can be used for an AM device. It can also be used for a PM device. The composition can also be used for the AM device and the PM device having a mode such as PC, TN, STN, ECB, OCB, IPS, VA or PSA. It is especially desirable to use the composition for the AM device having the IPS or VA mode. These devices may be of a reflection type, a transmission type or a semi-transmission type. It is desirable to use the composition for a device having the transmission type. It can be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three-dimensional network-polymer is formed in the composition.

EXAMPLES

When a sample was a composition, it was measured as it was, and the value obtained was described here. When a sample was a compound, a sample for measurement was prepared by mixing 15% by weight of the compound and 85% by weight of mother liquid crystals. The characteristic values of the compound were calculated from values obtained by measurement, according to a method of extrapolation. That is: (extrapolated value)=[(measured value of a sample)−0.85×(measured value of mother liquid crystals)]/0.15. When a smectic phase (or crystals) separated out in this ratio at 25° C., the ratio of the compound to the mother liquid crystals was changed step by step in the order of (10% by weight/90% by weight), (5% by weight/95% by weight) and (1% by weight/99% by weight). Values of the maximum temperature, the optical anisotropy, the viscosity and the dielectric anisotropy with regard to the compound were obtained by this extrapolation method.

The components of the mother liquid crystals were as follows.

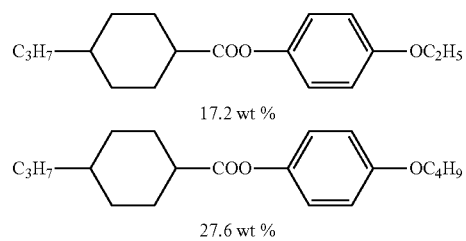

-continued

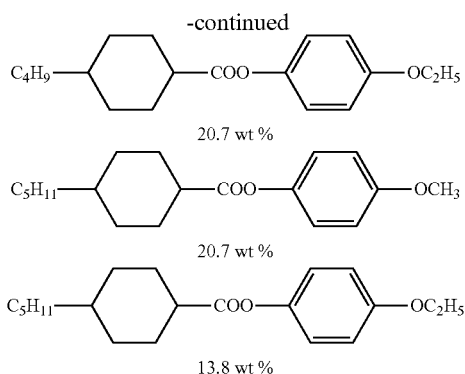

20.7 wt %

20.7 wt %

13.8 wt %

Characteristic values were measured according to the following methods. Most methods are described in the Standards of Electronic Industries Association of Japan, EIAJ·ED-2521 A or those with some modifications.

Maximum Temperature of a Nematic Phase (NI; ° C.): A sample was placed on a hot plate in a melting point apparatus equipped with a polarizing microscope and was heated at the rate of 1° C. per minute. The temperature was measured when part of the sample began to change from a nematic phase to an isotropic liquid. A higher limit of the temperature range of a nematic phase may be abbreviated to "the maximum temperature."

Minimum Temperature of a Nematic Phase (Tc; ° C.): A sample having a nematic phase was put in glass vials and then kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., Tc was expressed as ≦−20° C. A lower limit of the temperature range of a nematic phase may be abbreviated to "the minimum temperature."

Viscosity (bulk viscosity; η; measured at 20° C.; mPa·s): Viscosity was measured by use of an E-type viscometer.

Optical Anisotropy (refractive index anisotropy; Δn; measured at 25° C.): Measurement was carried out by use of an Abbe refractometer with a polarizing plate mounted on the ocular, using light at a wavelength of 589 nanometers. The surface of the main prism was rubbed in one direction, and then a sample was dropped on the main prism. A refractive index (n∥) was measured when the direction of polarized light was parallel to that of the rubbing. A refractive index (n⊥) was measured when the direction of polarized light was perpendicular to that of the rubbing. The value of optical anisotropy was calculated from the equation: $\Delta n = n\| - n\bot$.

Dielectric Anisotropy (Δ∈; measured at 25° C.): The value of dielectric anisotropy was calculated from the equation: $\Delta\epsilon = \epsilon\| - \epsilon\bot$. Dielectric constants (∈∥ and ∈⊥) were measured as follows.

1) Measurement of a dielectric constant (∈∥): A solution of octadecyltriethoxysilane (0.16 mL) in ethanol (20 mL) was applied to a thoroughly cleaned glass substrate. The glass substrate was rotated with a spinner, and then heated at 150° C. for one hour. A sample was poured into a VA device in which the distance between the two glass substrates (cell gap) was 4 micrometers, and then the device was sealed with an adhesive curable on irradiation with ultraviolet light. Sine waves (0.5 V, 1 kHz) were applied to the device, and a dielectric constant (∈∥) in the major axis direction of liquid crystal molecules was measured after 2 seconds.

2) Measurement of a dielectric constant (∈⊥): A polyimide solution was applied to a thoroughly cleaned glass substrate. The glass substrate was burned, and then the resulting alignment film was subjected to rubbing treatment. A sample was poured into a TN device in which the distance between the two glass substrates (cell gap) was 9 micrometers and the twist angle was 80 degrees. Sine waves (0.5 V, 1 kHz) were applied to the device, and a dielectric constant (∈⊥) in the minor axis direction of liquid crystal molecules was measured after 2 seconds.

Threshold Voltage (Vth; measured at 25° C.; V): Measurement was carried out with an LCD evaluation system Model LCD-5100 made by Otsuka Electronics Co., Ltd. The light source was a halogen lamp. A sample was poured into a VA device having a normally black mode, in which the distance between the two glass substrates (cell gap) was 4 micrometers and the rubbing direction was antiparallel, and then the device was sealed with an adhesive curable on irradiation with ultraviolet light. Voltage to be applied to the device (60 Hz, rectangular waves) was stepwise increased in 0.02 V increments from 0 V up to 20 V. During the increase, the device was irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The threshold voltage was voltage at 10% transmittance.

Voltage Holding Ratio (VHR-1; measured at 25° C.; %): A TN device used for measurement had a polyimide-alignment film, and the distance between the two glass substrates (cell gap) was 5 micrometers. A sample was poured into the device, and then the device was sealed with a UV-polymerizable adhesive. A pulse voltage (60 microseconds at 5 V) was applied to the TN device and the device was charged. A decreasing voltage was measured for 16.7 milliseconds with a high-speed voltmeter, and the area A between the voltage curve and the horizontal axis in a unit cycle was obtained. The area B was an area without the decrease. The voltage holding ratio was the percentage of the area A to the area B.

Voltage Holding Ratio (VHR-2; measured at 80° C.; %): A TN device used for measurement had a polyimide-alignment film, and the distance between the two glass substrates (cell gap) was 5 micrometer. A sample was poured into the device, and then the device was sealed with a UV-polymerizable adhesive. A pulse voltage (60 microseconds at 5 V) was applied to the TN device and the device was charged. A decreasing voltage was measured for 16.7 milliseconds with a high-speed voltmeter and the area A between the voltage curve and the horizontal axis in a unit cycle was obtained. The area B was an area without the decrease. The voltage holding ratio was a percentage of the area A to the area B.

Voltage Holding Ratio (VHR-3; measured at 25° C.; %): The stability to ultraviolet light was evaluated by measuring a voltage holding ratio after irradiation with ultraviolet light. A composition having a large VHR-3 has a high stability to ultraviolet light. A TN device used for measurement had a polyimide-alignment film and the cell gap was 5 micrometers. A sample was poured into this device, and then the device was irradiated with light for 20 minutes. The light source was an ultra high-pressure mercury lamp USH-500D (produced by Ushio, Inc.), and the distance between the device and the light source was 20 centimeters. In the measurement of VHR-3, a decreasing voltage was measured for 16.7 milliseconds. The value of VHR-3 is preferably 90% or more, and more preferably 95% or more.

Voltage Holding Ratio (VHR-4; measured at 25° C.; %): A TN device into which a sample was poured was heated in a constant-temperature bath at 80° C. for 500 hours, and then the stability to heat was evaluated by measuring the voltage holding ratio. A composition having a large VHR-4 has a high stability to heat. In the measurement of VHR-4, a decreasing voltage was measured for 16.7 milliseconds.

Response Time (τ; measured at 25° C.; millisecond): Measurement was carried out with an LCD evaluation system Model LCD-5100 made by Otsuka Electronics Co., Ltd. The light source was a halogen lamp. The low-pass filter was set at 5 kHz. A sample was poured into a VA device having a normally black mode, in which the cell gap between the two glass substrates was 4 micrometers, and the rubbing direction was antiparallel, and then the device was sealed with a UV curable adhesive. Rectangular waves (60 Hz, 10 V, 0.5 second) were applied to the device. The device was simultaneously irradiated with light in the perpendicular direction, and the amount of light passing through the device was measured. The maximum amount of light corresponded to 100% transmittance, and the minimum amount of light corresponded to 0% transmittance. The response time was the period of time required for the change from 90% to 10% transmittance (fall time; millisecond).

Specific Resistance (ρ; measured at 25° C.; Ωcm): A sample of 1.0 milliliter was poured into a vessel equipped with electrodes. DC voltage (10 V) was applied to the vessel, and the DC current was measured after 10 seconds. The specific resistance was calculated from the following equation. (specific resistance)=[(voltage)×(electric capacity of vessel)]/[(DC current)×(dielectric constant in vacuum)].

Gas Chromatographic Analysis: A gas chromatograph Model GC-14B made by Shimadzu Corporation was used for measurement. The carrier gas was helium (2 milliliters per minute). The sample injector and the detector (FID) were set to 280° C. and 300° C., respectively. A capillary column DB-1 (length 30 meters, bore 0.32 millimeter, film thickness 0.25 micrometer, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was dissolved in acetone (0.1% by weight), and 1 microliter of the solution was injected into the sample injector. A recorder used was a Model C-R5A Chromatopac Integrator made by Shimadzu Corporation or its equivalent. The resulting gas chromatogram showed the retention time of peaks and the peak areas corresponding to the component compounds.

Solvents for diluting the sample may also be chloroform, hexane and so forth. The following capillary columns may also be used in order to separate the component compounds: HP-1 made by Agilent Technologies Inc. (length 30 meters, bore 0.32 millimeter, film thickness 0.25 micrometer), Rtx-1 made by Restek Corporation (length 30 meters, bore 0.32 millimeter, film thickness 0.25 micrometer), and BP-1 made by SGE International Pty. Ltd. (length 30 meters, bore 0.32 millimeter, film thickness 0.25 micrometer). A capillary column CBP1-M50-025 (length 50 meters, bore 0.25 millimeter, film thickness 0.25 micrometer) made by Shimadzu Corporation may also be used for the purpose of avoiding an overlap of peaks of the compounds.

The ratio of the liquid crystal compounds included in the composition may be calculated according to the following method. The liquid crystal compounds are detected by use of a gas chromatograph. The ratio of peak areas in the gas chromatogram corresponds to the ratio (molar ratio) of the liquid crystal compounds. When the capillary columns described above are used, the correction coefficient of respective liquid crystal compounds may be regarded as 1 (one). Accordingly, the ratio (percentage by weight) of the liquid crystal compounds can be calculated from the ratio of peak areas.

The invention will be explained in detail by way of Examples. The invention is not limited by Examples described below. The compounds described in Comparative Examples and Examples were expressed as symbols according to the definition in the following Table 3. In Table 3, the configuration of 1,4-cyclohexylene is trans. A parenthesized number next to the symbolized compound in Example corresponds to the number of a compound. The symbol (–) means any other liquid crystal compound. Ratios (percentage) of liquid crystal compounds mean the percentages by weight (% by weight) based on the total weight of the liquid crystal composition. The liquid crystal composition further includes an impurity. Last, the characteristic values of the composition are summarized.

TABLE 3

Method of Description of Compounds using Symbols
R—(A$_1$)—Z$_1$—...—Z$_n$—(A$_n$)—R'

| 1) Left-terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn- |
| $CH_2$=CH— | V— |
| $C_nH_{2n+1}$—CH=CH— | nV— |
| $CH_2$=CH—$C_nH_{2n}$— | Vn- |
| $C_mH_{2m+1}$—CH=CH—$C_nH_{2n}$— | mVn- |
| $CF_2$=CH— | VFF— |
| $CF_2$=CH—$C_nH_{2n}$— | VFFn- |

| 2) Right-terminal Group —R' | Symbol |
|---|---|
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | -nV |
| —CH=$CF_2$ | —VFF |
| —$COOCH_3$ | -EMe |

| 3) Bonding Group —Z$_n$— | Symbol |
|---|---|
| —$C_2H_4$— | 2 |
| —COO— | E |
| —CH=CH— | V |
| —C≡C— | T |
| —$CF_2O$— | X |
| —$CH_2O$— | 1O |
| —$SiH_2$— | Si |

| 4) Ring Structure —A$_n$— | Symbol |
|---|---|
| 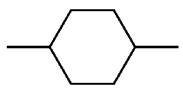 | H |
| 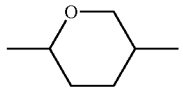 | Dh |
| 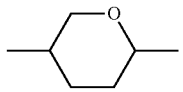 | dh |
|  | B |

TABLE 3-continued

Method of Description of Compounds using Symbols
R—(A₁)—Z₁— . . . —Zₙ—(Aₙ)—R'

| Structure | Symbol |
|---|---|
| (fluorobenzene with F) | B(F) |
| (fluorobenzene with F) | B(2F) |
| (difluorobenzene) | B(2F,3F) |
| (F, Cl benzene) | B(2F,3Cl) |
| (Cl, F benzene) | B(2Cl,3F) |
| (difluorobenzene) | B(2F,5F) |
| (chromane with 2F) | Cro(7F,8F) |

5) Examples of Description

Example 1. V2—BB(F)B-1

CH₂=CHCH₂CH₂—[ring]—[ring-F]—[ring]—CH₃

Wxample 2. 3-HB(2F,3F)—O2

C₃H₇—[cyclohexyl]—[2F,3F-phenyl]—OC₂H₅

Example 3. 3-HHB-1

C₃H₇—[cyclohexyl]—[cyclohexyl]—[phenyl]—CH₃

Example 4. 5-HB(F)HH-2

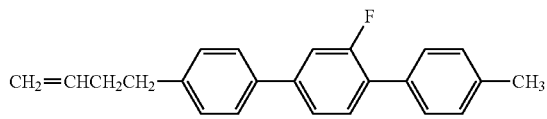

Comparative Example 1

Example 19 was selected from the compositions disclosed in JP 2001-262145 A. The basis of the selection was that the composition included the compound (1-5-1), the compound (3-1-1), the compound (3-2-1) and the compound (3-4-1), and had the smallest viscosity. The components and characteristics of the composition were as follows:

| Compound | Formula | % |
|---|---|---|
| 3-HDhB(2F,3F)-O2 | (1-5-1) | 6% |
| 5-HDhB(2F,3F)-O2 | (1-5-1) | 6% |
| 2-HH1SiB(2F,3F)-O2 | (—) | 6% |
| 3-HH1SiB(2F,3F)-O2 | (—) | 6% |
| 2-HH-3 | (3-1-1) | 6% |
| 3-HH-4 | (3-1-1) | 10% |
| 3-HB-O2 | (3-2-1) | 16% |
| 3-HB-O4 | (3-2-1) | 4% |
| 3-HHB-1 | (3-4-1) | 8% |
| 3-HHB-O1 | (3-4-1) | 5% |
| 3-HHB-3 | (3-4-1) | 8% |
| 2-HH-EMe | (—) | 4% |
| 3-HH-EMe | (—) | 15% |

NI = 80.4° C.; Tc ≤ −20° C.; Δn = 0.077; η = 14.3 mPa · s; Δε = −1.4.

Comparative Example 2

Example 12 was selected from the compositions disclosed in JP 2001-115161 A. The basis of the selection was that the composition included the compound (1-1-1), the compound (1-2-1), the compound (1-5-1), the compound (3-1-1), the compound (3-2-1) and the compound (3-4-1), and had the smallest viscosity (η). The components and characteristics of the composition were as follows:

| Compound | Formula | % |
|---|---|---|
| 3-DhB(2F,3F)-O2 | (1-1-1) | 3% |
| 5-DhB(2F,3F)-O2 | (1-1-1) | 6% |
| 3-Dh2B(2F,3F)-O2 | (1-2-1) | 3% |
| 3-HDhB(2F,3F)-O1 | (1-5-1) | 7% |
| 3-HDhB(2F,3F)-O2 | (1-5-1) | 7% |
| 3-HH-4 | (3-1-1) | 12% |
| 3-HB-O2 | (3-2-1) | 16% |
| 3-HB-O4 | (3-2-1) | 8% |
| 3-HHB-1 | (3-4-1) | 7% |
| 3-HHB-O1 | (3-4-1) | 5% |
| 3-HHB-3 | (3-4-1) | 10% |
| 2-HH-EMe | (—) | 6% |
| 3-HH-EMe | (—) | 10% |

NI = 72.0° C.; Tc ≤ −20° C.; Δn = 0.076; η = 16.2 mPa · s; Δε = −1.2.

Comparative Example 3

Example 9 was selected from the compositions disclosed in WO 2008/114821 A. The basis of the selection was that the composition included the compound (1-1-1), the compound (1-4-1), the compound (1-5-1), the compound (1-6-1), the compound (3-1-1), the compound (3-2-1), the compound (3-6-1), the compound (4-1), the compound (4-1-2-1) and the compound (4-1-7-1), and had the smallest viscosity (η). The components and characteristics of the composition were as follows:

| | | |
|---|---|---|
| 3-DhB(2F,3F)-O2 | (1-1-1) | 5% |
| 5-DhB(2F,3F)-O2 | (1-1-1) | 5% |
| 3-DhHB(2F,3F)-O2 | (1-4-1) | 5% |
| 5-DhHB(2F,3F)-O2 | (1-4-1) | 5% |
| 3-HDhB(2F,3F)-O2 | (1-5-1) | 5% |
| 5-HDhB(2F,3F)-O2 | (1-5-1) | 5% |
| 3-DhBB(2F,3F)-O2 | (1-6-1) | 5% |
| 5-DhBB(2F,3F)-O2 | (1-6-1) | 5% |
| 2-BB(F)B-3 | (3-6-1) | 5% |
| 2-BB(F)B-5 | (3-6-1) | 5% |
| 3-BB(F)B-3 | (3-6-1) | 5% |
| 1V-HH-3 | (3-1-1) | 5% |
| 3-HB-O2 | (3-2-1) | 5% |
| 3-H2B(2F,3F)-O2 | (4-1-2-1) | 7% |
| 5-H2B(2F,3F)-O2 | (4-1-2-1) | 7% |
| 2-HHB(2F,3Cl)-O2 | (4-1) | 7% |
| 3-HBB(2F,3F)-O2 | (4-1-7-1) | 7% |
| 5-HBB(2F,3F)-O2 | (4-1-7-1) | 7% |

NI = 95.0° C.; Tc ≦ −20° C.; Δn = 0.134; η = 41.8 mPa · s; Δε = −5.2.

Example 1

| | | |
|---|---|---|
| 5-DhB(2F,3F)-O2 | (1-1-1) | 7% |
| 3-Dh2B(2F,3F)-O2 | (1-2-1) | 8% |
| 3-DhHB(2F,3F)-O2 | (1-4-1) | 5% |
| 3-HDhB(2F,3F)-O2 | (1-5-1) | 6% |
| 3-DhBB(2F,3F)-O2 | (1-6-1) | 8% |
| 4-DhBB(2F,3F)-O2 | (1-6-1) | 6% |
| 5-DhBB(2F,3F)-O2 | (1-6-1) | 7% |
| 3-HB(F)HH-2 | (2-1-1) | 5% |
| 3-HB(F)HH-5 | (2-1-1) | 5% |
| V-HH-3 | (3-1-1) | 43% |

NI = 85.2° C.; Tc ≦ −20° C.; Δn = 0.087; η = 13.1 mPa · s; Δε = −2.8; Vth = 2.39 V; γ1 = 42.2 mPa · s; VHR-1 = 99.2%; VHR-2 = 98.1%; VHR-3 = 98.2%.

Example 2

| | | |
|---|---|---|
| 3-DhB(2F,3F)-O2 | (1-1-1) | 5% |
| 3-Dh1OB(2F,3F)-O2 | (1-3-1) | 5% |
| 3-HDhB(2F,3F)-O2 | (1-5-1) | 7% |
| 5-HDhB(2F,3F)-O2 | (1-5-1) | 7% |
| 3-HB(F)HH-V | (2-1-1) | 7% |
| 2-HH-3 | (3-1-1) | 5% |
| V-HH-3 | (3-1-1) | 35% |
| V-HHB-1 | (3-4-1) | 8% |
| 3-H1OB(2F,3F)-O2 | (4-1-3-1) | 4% |
| 5-H1OB(2F,3F)-O2 | (4-1-3-1) | 4% |
| 3-HH1OB(2F,3F)-O2 | (4-1-6-1) | 4% |
| 3-HH2Cro(7F,8F)-5 | (4-2-3-2) | 3% |
| 3-HBCro(7F,8F)-5 | (4-2-3-4) | 3% |
| 3-BBCro(7F,8F)-5 | (4-2-3-5) | 3% |

NI = 81.5° C.; Tc ≦ −20° C.; Δn = 0.080; η = 13.0 mPa · s; Δε = −2.6; γ1 = 41.8 mPa · s; VHR-1 = 99.1%; VHR-2 = 98.1%; VHR-3 = 98.2%.

Example 3

| | | |
|---|---|---|
| 3-DhB(2F,3F)-O2 | (1-1-1) | 6% |
| 5-DhB(2F,3F)-O2 | (1-1-1) | 7% |
| 3-Dh1OB(2F,3F)-O2 | (1-3-1) | 5% |
| 5-HB(F)HH-2 | (2-1-1) | 5% |
| V-HH-3 | (3-1-1) | 32% |
| 1V-HH-3 | (3-1-1) | 7% |
| 3-HB-O2 | (3-2-1) | 3% |
| 1V-HBB-2 | (3-5-1) | 4% |
| 2-BB(F)B-3 | (3-6-1) | 5% |
| 3-HBB(2F,3F)-O2 | (4-1-7-1) | 6% |
| 5-HBB(2F,3F)-O2 | (4-1-7-1) | 7% |
| 3-H2Cro(7F,8F)-5 | (4-2-1-1) | 3% |
| 3-H1OCro(7F,8F)-5 | (4-2-1-2) | 4% |
| 3-HHCro(7F,8F)-5 | (4-2-3-1) | 3% |
| 5-HBB(F)B-2 | (—) | 3% |

NI = 73.9° C.; Tc ≦ −20° C.; Δn = 0.095; η = 11.9 mPa · s; Δε = −2.2; VHR-1 = 99.0%; VHR-2 = 98.1%; VHR-3 = 98.2%.

Example 4

| | | |
|---|---|---|
| 3-DhB(2F,3F)-O2 | (1-1-1) | 5% |
| 5-DhB(2F,3F)-O2 | (1-1-1) | 5% |
| 3-dhBB(2F,3F)-O2 | (1-7-1) | 6% |
| 5-dhBB(2F,3F)-O2 | (1-7-1) | 6% |
| 5-HB(F)HH-V | (2-1-1) | 6% |
| V-HH-3 | (3-1-1) | 40% |
| 1-BB(F)B-2V | (3-6-1) | 4% |
| V-HB(2F,3F)-O2 | (4-1-1-1) | 8% |
| 3-H2B(2F,3F)-O2 | (4-1-2-1) | 5% |
| 3-H2Cro(7F,8F)-3 | (4-2-1-1) | 3% |
| 3-H2Cro(7F,8F)-5 | (4-2-1-1) | 3% |
| 2O-Cro(7F,8F)HH-5 | (4-2-4-1) | 3% |
| 3-Cro(7F,8F)2HH-5 | (4-2-4-2) | 3% |
| 3-HHEBH-5 | (—) | 3% |

NI = 70.5° C.; Tc ≦ −20° C.; Δn = 0.085; η = 12.2 mPa · s; Δε = −2.0; VHR-1 = 99.0%; VHR-2 = 98.1%; VHR-3 = 98.0%.

Example 5

| | | |
|---|---|---|
| 3-DhB(2F,3F)-O2 | (1-1-1) | 7% |
| 5-DhB(2F,3F)-O2 | (1-1-1) | 7% |
| 3-HB(F)HH-2 | (2-1-1) | 6% |
| 3-HB(F)HH-5 | (2-1-1) | 6% |
| V-HH-3 | (3-1-1) | 32% |
| 1V-HH-3 | (3-1-1) | 8% |
| V2-BB-1 | (3-3-1) | 3% |
| V2-HHB-1 | (3-4-1) | 4% |
| 2-HBB(2F,3F)-O2 | (4-1-7-1) | 5% |
| 3-HBB(2F,3F)-O2 | (4-1-7-1) | 11% |
| 2-Cro(7F,8F)2H-3 | (4-2-2-1) | 3% |
| 2O-Cro(7F,8F)2H-3 | (4-2-2-1) | 3% |
| 3-HH1OCro(7F,8F)-5 | (4-2-3-3) | 5% |

NI = 82.2° C.; Tc ≦ −20° C.; Δn = 0.085; η = 12.8 mPa · s; Δε = −2.1; VHR-1 = 99.2%; VHR-2 = 98.2%; VHR-3 = 98.2%.

Example 6

| | | |
|---|---|---|
| 3-HDhB(2F,3F)-O2 | (1-5-1) | 5% |
| 5-HDhB(2F,3F)-O2 | (1-5-1) | 5% |
| 3-HB(F)HH-5 | (2-1-1) | 4% |

-continued

| | | |
|---|---|---|
| 5-HB(F)HH-V | (2-1-1) | 4% |
| 3-HH-O1 | (3-1-1) | 3% |
| V-HH-3 | (3-1-1) | 32% |
| V-HH-5 | (3-1-1) | 5% |
| 3-HHB(2F,3Cl)-O2 | (4-1) | 4% |
| 3-HB(2F,3F)-O2 | (4-1-1-1) | 12% |
| 5-HB(2F,3F)-O2 | (4-1-1-1) | 9% |
| V-HHB(2F,3F)-O2 | (4-1-4-1) | 6% |
| 3-H2Cro(7F,8F)-5 | (4-2-1-1) | 5% |
| 5-HBBH-3 | (—) | 3% |
| 5-HB(F)BH-3 | (—) | 3% |

NI = 80.7° C.; Tc ≦ −20° C.; Δn = 0.077; η = 11.8 mPa · s; Δε = −2.2; VHR-1 = 99.1%; VHR-2 = 98.2%; VHR-3 = 98.2%.

Example 7

| | | |
|---|---|---|
| 3-DhB(2F,3F)-O2 | (1-1-1) | 6% |
| 5-DhB(2F,3F)-O2 | (1-1-1) | 6% |
| 3-Dh1OB(2F,3F)-O2 | (1-3-1) | 5% |
| 3-DhBB(2F,3F)-O2 | (1-6-1) | 5% |
| 5-DhBB(2F,3F)-O2 | (1-6-1) | 4% |
| 3-HB(F)HH-5 | (2-1-1) | 5% |
| 3-HH-VFF | (3-1) | 3% |
| V-HH-3 | (3-1-1) | 28% |
| 1V2-BB-1 | (3-3-1) | 4% |
| V2-BB(F)B-1 | (3-6-1) | 4% |
| 3-HHEH-3 | (3-7-1) | 3% |
| 5-HBB(2F,3Cl)-O2 | (4-1) | 5% |
| 3-HB(2F,3F)-O2 | (4-1-1-1) | 5% |
| 5-HB(2F,3F)-O2 | (4-1-1-1) | 5% |
| 3-HHB(2F,3F)-O2 | (4-1-4-1) | 5% |
| 3-HH2B(2F,3F)-O2 | (4-1-5-1) | 7% |

NI = 72.1° C.; Tc ≦ −20° C.; Δn = 0.093; η = 12.8 mPa · s; Δε = −2.4; VHR-1 = 99.0%; VHR-2 = 98.1%; VHR-3 = 98.2%.

Example 8

| | | |
|---|---|---|
| 3-DhB(2F,3F)-O2 | (1-1-1) | 6% |
| 5-DhB(2F,3F)-O2 | (1-1-1) | 6% |
| 3-Dh1OB(2F,3F)-O2 | (1-3-1) | 5% |
| 3-HDhB(2F,3F)-O2 | (1-5-1) | 7% |
| 5-HDhB(2F,3F)-O2 | (1-5-1) | 7% |
| 3-HB(2F)HH-3 | (2) | 3% |
| 3-HB(2F)HH-5 | (2) | 3% |
| 3-BB(2F,5F)B-2 | (3) | 3% |
| V-HH-3 | (3-1-1) | 32% |
| 1V-HH-3 | (3-1-1) | 6% |
| 3-HHB-1 | (3-4-1) | 4% |
| 3-HHB-O1 | (3-4-1) | 4% |
| 3-HBB(2F,3F)-O2 | (4-1-7-1) | 10% |
| 1O1-HBBH-5 | (—) | 4% |

NI = 89.7° C.; Tc ≦ −20° C.; Δn = 0.089; η = 12.9 mPa · s; Δε = −2.2; VHR-1 = 99.1%; VHR-2 = 98.2%; VHR-3 = 98.2%.

The compositions of Examples 1 to 8 have a small viscosity in comparison with those in Comparative Examples 1 to 3. Thus, the liquid crystal composition of the invention is so much superior in characteristics to the compositions disclosed in the patent documents No. 1 to No. 3.

INDUSTRIAL APPLICABILITY

The invention provides a liquid crystal composition that satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat, or that is suitably balanced regarding at least two of the characteristics. A liquid crystal display device containing such a liquid crystal composition becomes an AM device that has a short response time, a large voltage holding ratio, a large contrast ratio, a long service life and so forth, and thus it can be used for a liquid crystal projector, a liquid crystal television and so forth.

What is claimed is:

1. A liquid crystal composition that has negative dielectric anisotropy and includes at least one compound selected from the group of compounds represented by formula (1) as a first component and at least one compound selected from the group of compounds represented by formula (2) as a second component:

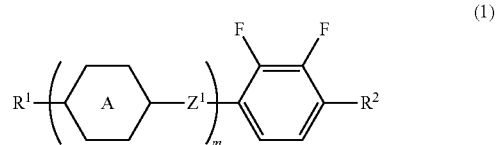

(1)

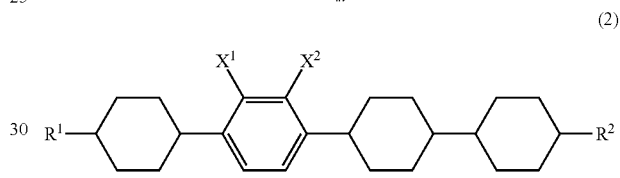

(2)

wherein $R^1$ and $R^2$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring A is independently tertahydropyran-2,5-diyl, 1,4-cyclohexylene or 1,4-phenylene, and at least one of the rings A is tertahydropyran-2,5-diyl; $Z^1$ is independently a single bond, ethylene, methyleneoxy or carbonyloxy; one of $X^1$ and $X^2$ is hydrogen and the other is fluorine; and m is 1, 2 or 3.

2. The liquid crystal composition according to claim 1, wherein the first component is at least one compound selected from the group of compounds represented by formula (1-1) to formula (1-7):

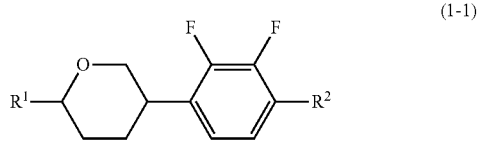

(1-1)

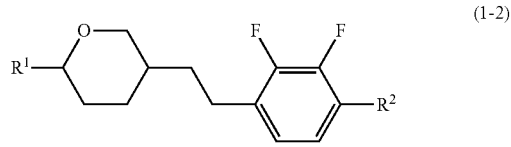

(1-2)

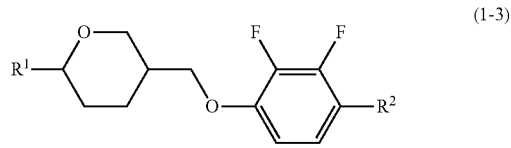

(1-3)

-continued

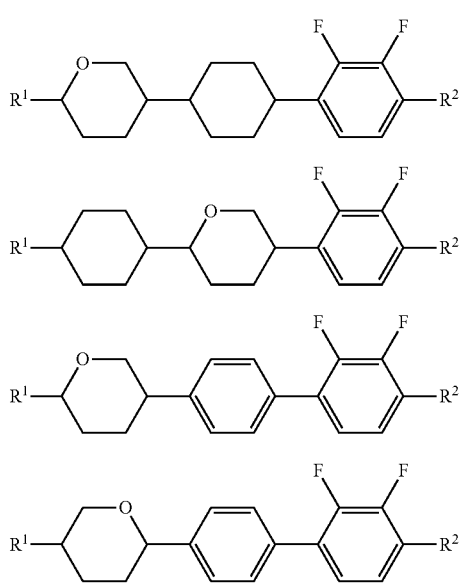

(1-4)

(1-5)

(1-6)

(1-7)

wherein $R^1$ and $R^2$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

3. The liquid crystal composition according to claim 2, wherein the first component is at least one compound selected from the group of compounds represented by formula (1-1) to formula (1-3).

4. The liquid crystal composition according to claim 2, wherein the first component is at least one compound selected from the group of compounds represented by formula (1-4) to formula (1-7).

5. The liquid crystal composition according to claim 2, wherein the first component is a mixture of at least one compound selected from the group of compounds represented by formula (1-1) to formula (1-3) and at least one compound selected from the group of compounds represented by formula (1-4) to formula (1-7).

6. The liquid crystal composition according to claim 1, wherein the second component is at least one compound selected from the group of compounds represented by formula (2-1):

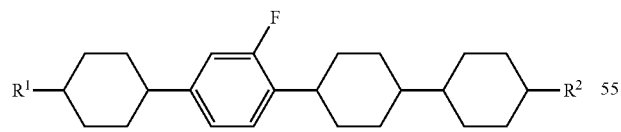

(2-1)

wherein $R^1$ and $R^2$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

7. The liquid crystal composition according to claim 1, wherein the ratio of the first component is in the range of 5% by weight to 70% by weight and the ratio of the second component is in the range of 5% by weight to 30% by weight, based on the total weight of the liquid crystal composition.

8. The liquid crystal composition according to claim 1, further including at least one compound selected from the group of compounds represented by formula (3) as a third component:

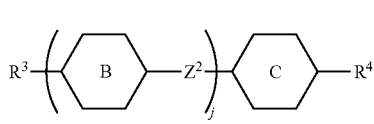

(3)

wherein $R^3$ and $R^4$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring B and the ring C are independently 1,4-cyclohexylene, 1,4-phenylene, 2-fluoro-1,4-phenylene, 3-fluoro-1,4-phenylene or 2,5-difluoro-1,4-phenylene; $Z^2$ is independently a single bond, ethylene or carbonyloxy; and j is 1 or 2.

9. The liquid crystal composition according to claim 8, wherein the third component is at least one compound selected from the group of compounds represented by formula (3-1) to formula (3-7):

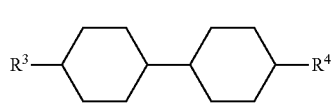

(3-1)

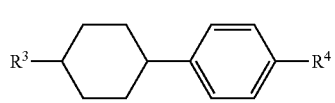

(3-2)

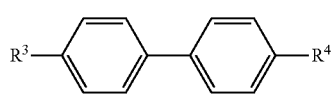

(3-3)

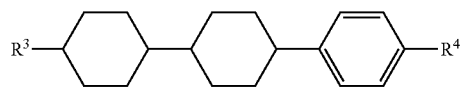

(3-4)

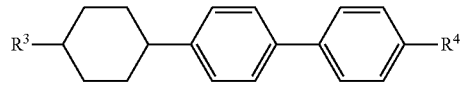

(3-5)

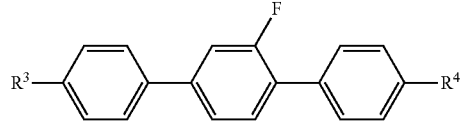

(3-6)

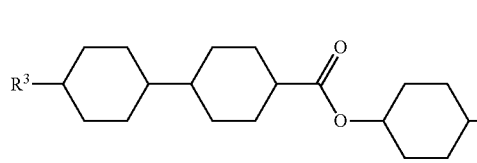

(3-7)

wherein $R^3$ and $R^4$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

10. The liquid crystal composition according to claim 9, wherein the third component is at least one compound selected from the group of compounds represented by formula (3-1).

11. The liquid crystal composition according to claim 8, wherein the ratio of the third component is in the range of 30% by weight to 70% by weight based on the total weight of the liquid crystal composition.

12. The liquid crystal composition according to claim 1, further including at least one compound selected from the group of compounds represented by formula (4-1) and formula (4-2) as a fourth component:

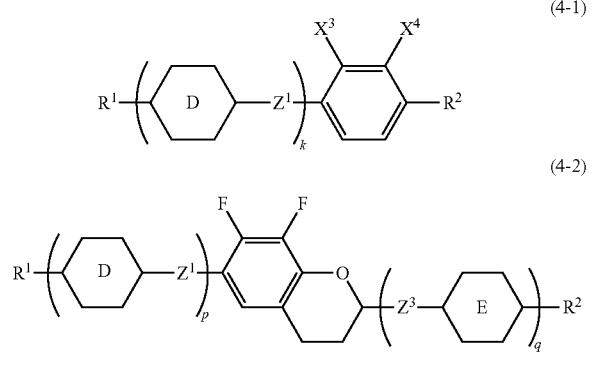

wherein $R^1$ and $R^2$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring D and the ring E are independently 1,4-cyclohexylene or 1,4-phenylene; $Z^1$ and $Z^3$ are independently a single bond, ethylene, methyleneoxy or carbonyloxy; $X^3$ and $X^4$ are independently fluorine or chlorine; k is 1, 2 or 3; and p and q are independently 0, 1, 2 or 3, and sum of p and q is 3 or less.

13. The liquid crystal composition according to claim 12, wherein the fourth component is at least one compound selected from the group of compounds represented by formula (4-1-1) to formula (4-1-7) and formula (4-2-1) to formula (4-2-4):

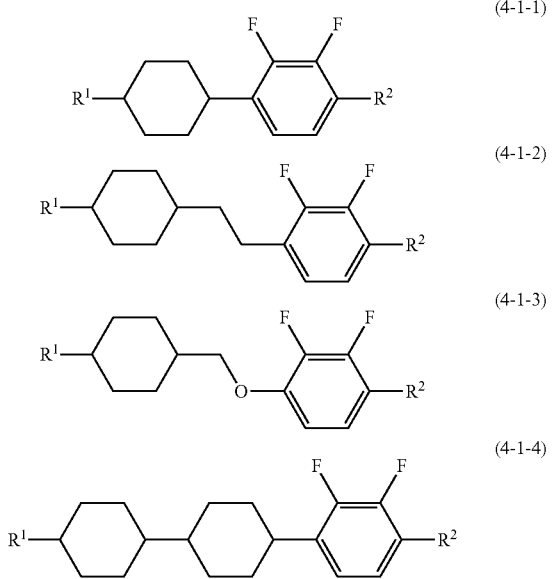

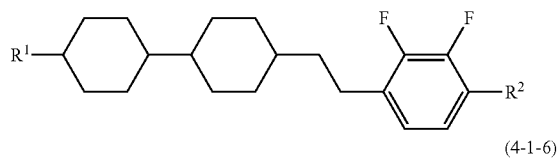

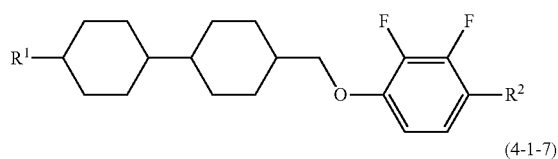

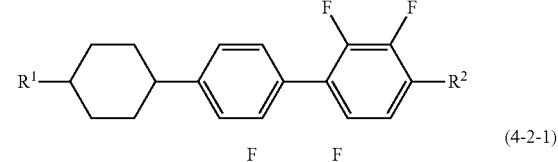

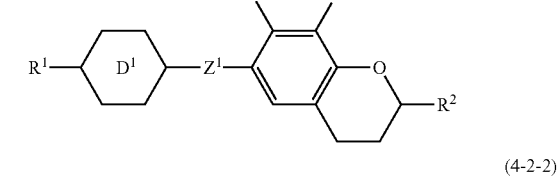

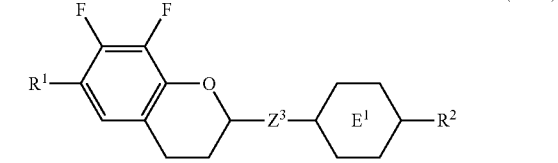

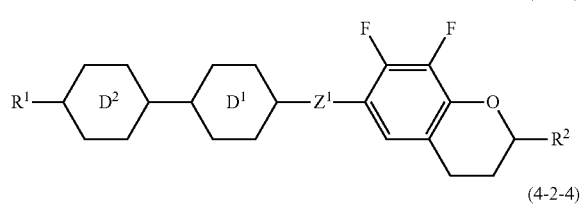

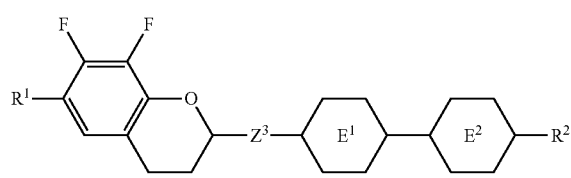

wherein $R^1$ and $R^2$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring $D^1$, the ring $D^2$, the ring $E^1$ and the ring $E^2$ are independently 1,4-cyclohexylene or 1,4-phenylene; and $Z^1$ and $Z^3$ are independently a single bond, ethylene, methyleneoxy or carbonyloxy.

14. The liquid crystal composition according to claim 12, wherein the ratio of the fourth component is in the range of 5% by weight to 50% by weight based on the total weight of the liquid crystal composition.

15. The liquid crystal composition according to claim 1, wherein the maximum temperature of a nematic phase is 70° C. or higher, the optical anisotropy (25° C.) at a wavelength of 589 nanometers is 0.08 or more, and the dielectric anisotropy (25° C.) at a frequency of 1 kHz is −2 or less.

16. A liquid crystal display device containing the liquid crystal composition according to claim 1.

17. The liquid crystal display device according to claim 16, wherein an operating mode of the liquid crystal display device is a VA mode, an IPS mode or a PSA mode, and a driving mode of the liquid crystal display device is an active matrix mode.

18. The liquid crystal composition according to claim 8, further including at least one compound selected from the group of compounds represented by formula (4-1) and formula (4-2) as a fourth component:

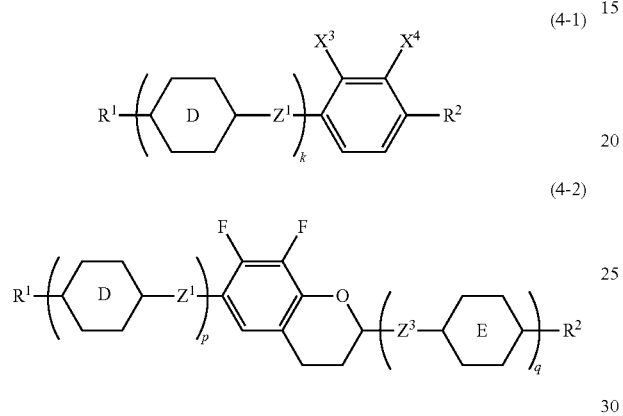

wherein $R^1$ and $R^2$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring D and the ring E are independently 1,4-cyclohexylene or 1,4-phenylene; $Z^1$ and $Z^3$ are independently a single bond, ethylene, methyleneoxy or carbonyloxy; $X^3$ and $X^4$ are independently fluorine or chlorine; k is 1, 2 or 3; and p and q are independently 0, 1, 2 or 3, and sum of p and q is 3 or less.

19. The liquid crystal composition according to claim 18, wherein the fourth component is at least one compound selected from the group of compounds represented by formula (4-1-1) to formula (4-1-7) and formula (4-2-1) to formula (4-2-4):

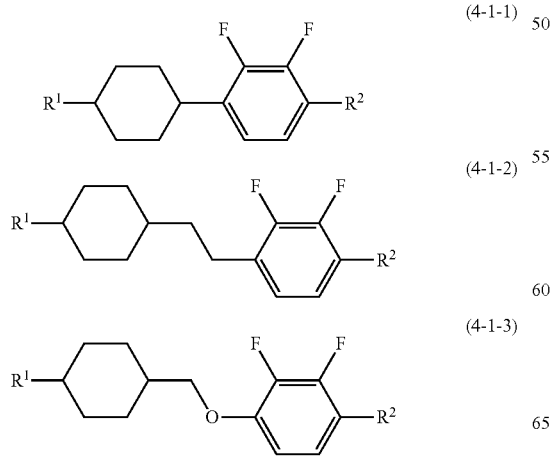

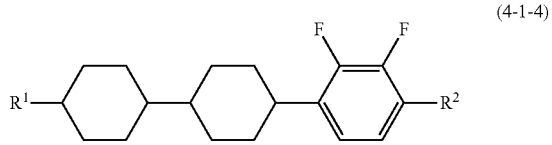

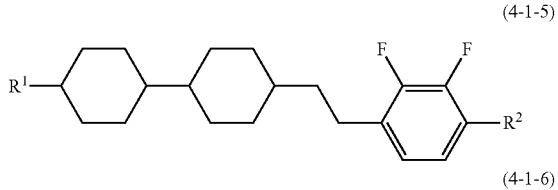

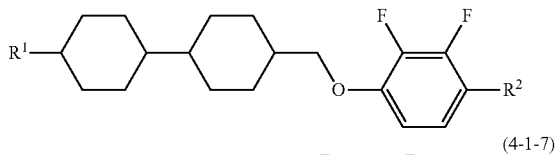

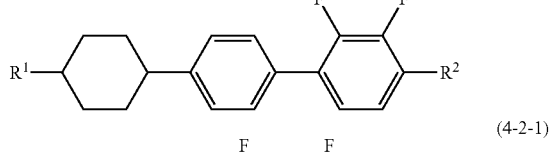

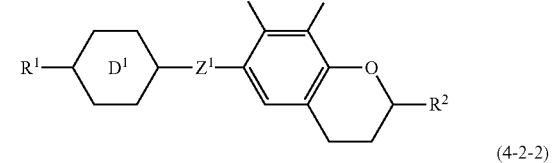

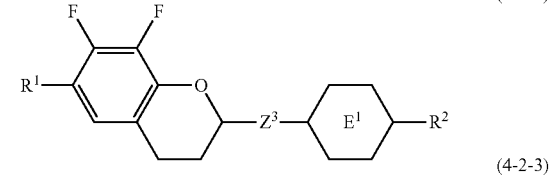

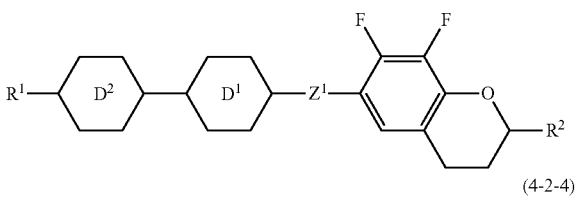

wherein $R^1$ and $R^2$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring $D^1$, the ring $D^2$, the ring $E^1$ and the ring $E^2$ are independently 1,4-cyclohexylene or 1,4-phenylene; and $Z^1$ and $Z^3$ are independently a single bond, ethylene, methyleneoxy or carbonyloxy.

20. The liquid crystal composition according to claim 18, wherein the ratio of the fourth component is in the range of 5% by weight to 50% by weight based on the total weight of the liquid crystal composition.

* * * * *